United States Patent
Mayer et al.

(10) Patent No.: US 8,800,700 B2
(45) Date of Patent: Aug. 12, 2014

(54) SNOW GROOMER

(75) Inventors: Andreas Mayer, Ehingen (DE); Christof Luigart, Erbach (DE); Peter Betz, Baustetten (DE); Michael Kuhn, Achstetten (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 364 days.

(21) Appl. No.: 13/286,262

(22) Filed: Nov. 1, 2011

(65) Prior Publication Data

US 2012/0110878 A1  May 10, 2012

(30) Foreign Application Priority Data

Nov. 5, 2010 (DE) .......................... 10 2010 043 511

(51) Int. Cl.
*E01H 4/00* (2006.01)

(52) U.S. Cl.
USPC ...................... 180/65.245; 37/219

(58) Field of Classification Search
CPC ............. B60K 3/04; B60K 6/00; B60K 6/46; B60K 17/12; B60K 5/08; B62D 55/00; B60Y 2200/25; F02B 63/04; F02B 63/047
USPC .......... 37/219–229; 180/65.245, 6.5, 65.265, 180/65.6, 6.7, 65.22, 9.23, 65.31, 6.44; 280/40 C; 244/60
See application file for complete search history.

(56) References Cited

U.S. PATENT DOCUMENTS

| 4,554,989 | A  | * | 11/1985 | Gruich et al. ............ 180/65.245 |
| 5,350,031 | A  |   | 9/1994  | Sugiyama et al. |
| 6,691,806 | B2 | * | 2/2004  | Wolfgang et al. .............. 180/6.7 |
| 7,025,158 | B2 |   | 4/2006  | Kanzler et al. |
| 7,397,141 | B2 | * | 7/2008  | Gouker ....................... 290/40 C |
| 7,950,481 | B2 | * | 5/2011  | Betz et al. .................. 180/65.31 |
| 2002/0079145 | A1 | | 6/2002 | Kanzler et al. |
| 2003/0015356 | A1 | | 1/2003 | Wolfgang et al. |
| 2003/0205422 | A1 | | 11/2003 | Morrow et al. |
| 2007/0235236 | A1 | | 10/2007 | Zwilling et al. |

FOREIGN PATENT DOCUMENTS

| DE | 198 02 549 C1 | 8/1999 |
| DE | 100 05 527 A1 | 8/2001 |
| DE | 20 2010 017 000 U1 | 4/2011 |
| EP | 0 895 495 B1 | 2/1999 |
| WO | WO 94/09548 | 4/1994 |
| WO | WO 2010/103117 A1 | 9/2010 |

OTHER PUBLICATIONS

German Patent Office Examination Report dated Jun. 19, 2012 (6 pages).
European Patent Office Search Report dated Mar. 7, 2012 (5 pages) with English translation of categories of cited documents.

* cited by examiner

*Primary Examiner* — Robert Pezzuto
(74) *Attorney, Agent, or Firm* — Flynn, Thiel, Boutell & Tanis, P.C.

(57) ABSTRACT

Snow groomer for treating snow-covered surfaces, the snow groomer having an internal combustion engine and at least one generator connected via power electronics to at least one electric motor for a rotational functional drive of the snow groomer, wherein two generators are connected in parallel between the internal combustion engine and the power electronics.

10 Claims, 2 Drawing Sheets

SNOW GROOMER

FIELD OF THE INVENTION

The invention relates to a snow groomer having an internal combustion engine and having at least one generator which is connected via power electronics to at least one electric motor for a rotational functional drive of the snow groomer.

BACKGROUND OF THE INVENTION

Such a snow groomer is known from EP 0 895 495 B1. The snow groomer is a hybrid vehicle in which a diesel engine drives an electric generator which feeds an electric traction drive, specifically the chain drive, via power electronics. The chain drive respectively has a sprocket wheel for each of the two traction chains, which sprocket wheel drives the respective traction chain. Each sprocket wheel is driven by one electric motor in each case. The snow groomer also has a rear-mounted cutter whose cutter drive is also formed by an electric motor which is fed by means of the power electronics via the generator.

WO 94/09548 A1 discloses a similar diesel-electric snow groomer in which likewise a diesel engine drives a generator which feeds electric traction drives and cutter drives via corresponding power electronics.

The object of the invention is to provide a snow groomer of the type mentioned at the beginning which makes possible a sufficient emergency operating mode.

This object is achieved in that two generators which are connected in parallel are provided between the internal combustion engine and the power electronics. The two electric generators preferably have the same power. Each generator preferably has a power between 100 and 200 kW, preferably 140 kW. Since the two generators which are connected in parallel act as a double generator in the normal operating mode of the snow groomer, twice the power, in particular between 200 and 400 kW, preferably 280 kW, is therefore available. By virtue of the solution according to the invention, if a generator fails or in the event of a fault in a generator the second generator is still available to change a corresponding function of the snow groomer, such as in particular a driving function, a cutting function, a winching function or the like, into a safe state and/or to ensure an emergency operating mode. A traction drive, in particular a sprocket wheel drive, a cutting shaft drive for a rear-mounted cutter or a winch drive for a winch which is arranged on the snow groomer is provided as a rotational functional drive. Other rotational secondary drives of the snow groomer are also covered by the term functional drive.

The solution according to the invention provides a redundant system.

In one refinement of the invention, the internal combustion engine is assigned a transfer transmission to which the two generators are connected on the output side. The two generators are connected mechanically by flanges to the transfer transmission. This has the advantage that energy is assisted or fed back, in particular during downhill travel or during braking processes of the snow groomer, via the transfer transmission and the internal combustion engine. The corresponding, fed-back energy can be taken up by the internal combustion engine by increasing the rotational speed.

In a further refinement, traction motors for a chain drive, at least one cutting shaft drive and/or a winch drive, are provided as functional drives. As a result, the central components of a snow groomer which is used to treat a snow piste surface are electrified.

In a further refinement of the invention, the electric motors of the functional drives are formed by synchronous motors. This refinement is advantageous for snow groomers since a high level of torque is already available at low rotational speeds.

In a further refinement of the invention, the power electronics are constructed as a direct current intermediate circuit. This is advantageous for actuation with direct-current-operated synchronous motors.

In a further refinement of the invention, current rectifiers are assigned to the generators. Preferably, a frequency converter is integrated in a housing of each electric generator.

In a further refinement of the invention, an electric switching element, which can electrically disconnect the generator from the power electronics, is provided for each generator. In particular a relay, which is installed in an electrical line between the power electronics and the assigned generator, is provided as an electric switching element. The solution makes it possible to disconnect the generator from the drive system in the event of a fault or else if the generator fails, and to provide an emergency operating mode via the other, still functioning generator.

In a further refinement of the invention, an electronic controller is provided which activates the switching element as a function of functional monitoring of the generator for disconnection of the generator from the power electronics. The electronic controller has means for monitoring the functioning of each generator. Corresponding data are transmitted to a comparison and evaluation unit of the electronic controller, which then performs, as a function of the result of the comparison and of the evaluation, corresponding actuation of the electric switching element for disconnecting the generator.

Further advantages and features of the invention emerge from the claims and from the following description of a preferred exemplary embodiment of the invention which is illustrated on the basis of the drawings.

DETAILED DESCRIPTION

Figure 1:
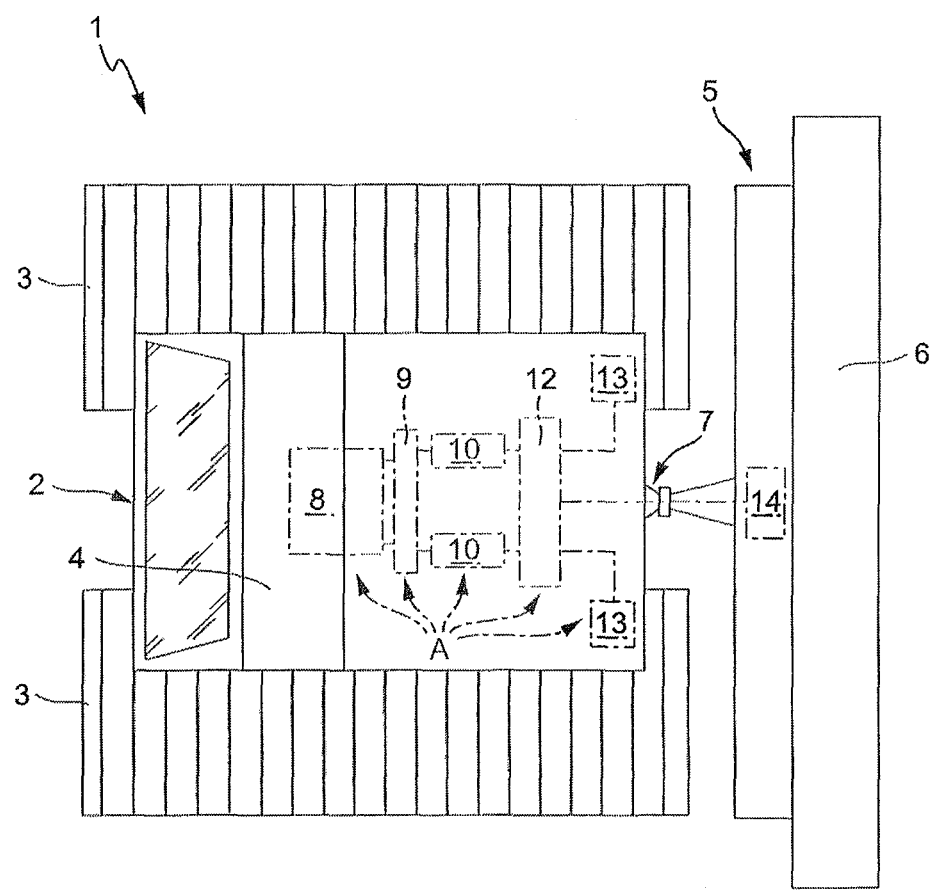
FIG. 1 is a schematic plan view of an embodiment of a snow groomer according to the invention with a drive system which is indicated by dot-dash lines.

A snow groomer 1 according to FIG. 1 has a chassis 2 on which a vehicle body with a driver's cab 4 is seated in a basically known fashion. The snow groomer 1 has in each case a traction chain 3 on opposite sides, which traction chains 3 jointly implement the chain drive and accordingly the traction drive for the snow groomer 1. Each traction chain 3 can be driven by means of a sprocket wheel (not illustrated in more detail) in a rear region of the chassis 2. At the rear, the chassis 2 of the snow groomer 1 is provided with a rear-mounted equipment carrier 7 on which a rear-mounted cutter 5 is secured in the illustrated exemplary embodiment. The rear-mounted cutter 5 comprises a finisher arrangement 6, which is also referred to as a smoothing device. The snow groomer 1 is operated with a drive system A (described in more detail below) which is arranged substantially on the chassis 2. The drive system A is a hybrid drive system, wherein an internal combustion engine in the form of a diesel engine 8 is combined with an electric drive unit.

Figure 2:
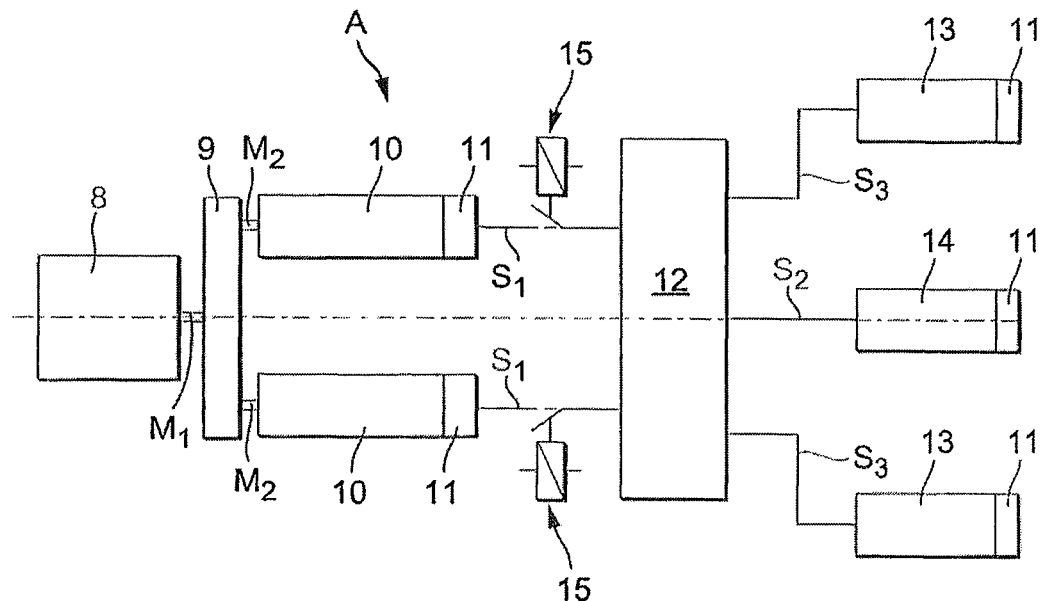
FIG. 2 is an enlarged block circuit diagram of the drive system of the snow groomer according to FIG. 1.

As can be seen from FIG. 2, a transfer transmission 9, which is mechanically operatively connected to the diesel engine 8, is connected by flanges to the diesel engine 8. The mechanical operative connection is indicated by the reference symbol $M_1$. The transfer transmission 9 has two drive trains, to each of which an electric generator 10 is connected by flanges. For this purpose, in each case one shaft of each generator 10 is mechanically connected via a mechanical operative connection $M_2$ to a corresponding output of the transfer transmission 9. A drive shaft of the diesel engine 8 is accordingly mechanically connected to the shafts of the two generators 10 via the transfer transmission 9. The two generators 10 are of identical design and are connected by flanges to the transfer transmission 9 in a parallel connection to one another. The two generators 10 each have an integrated frequency converter 11, with the result that the two generators 10 feed direct current to power electronics 12 via one electrical connection $S_1$ each. Three electric motors are connected to the power electronics 12, the two electric motors 13 of which serve to drive the sprocket wheels of the right-hand and left-hand side traction chains 3. The electric motor 14 is provided for driving a cutting shaft of the rear-mounted cutter 5. The power electronics 12 actuate, via one control line $S_3$ in each case, the respective electric motor 13 for the right-hand or left-hand side traction drive, and the electric motor 14 for the cutting drive via a control line $S_2$.

In the illustrated exemplary embodiment, each generator has a power of 140 kW. Since the two generators 10 are operated in a parallel connection, the function of a double generator with a power of 280 kW results. The power electronics 12 constitute an intermediate circuit which forms a common energy pool for all the electric units within the drive system A. The electric motors 13 and 14 are each permanent synchronous motors which operate with a voltage of 750 V direct current. Current rectifiers, i.e. frequency converters 11, are also integrated into the permanent synchronous motors of the electric motors 13 and 14. The power of each electric motor 13, 14 is also 140 kW in the illustrated exemplary embodiment.

As can be seen from FIG. 2, each electric line $S_1$ between the respective generator 10 and the power electronics 12 can be disconnected by means of a relay 15 which serves as an electric switching element. The respective relay 15 is actuated as a function of functional monitoring of the assigned generator 10. The functional monitoring can take place by means of the power electronics 12 or a separate electronic control unit. The actuation of the respective relay 15 takes place when a malfunction or a failure of the corresponding generator 10 has been detected. The relay 15 in the respective line $S_1$ then disconnects the electrical connection between the generator 10 and the power electronics 12. Owing to the redundant design, the second generator still remains after the first generator has been disconnected, said second generator permitting at least an emergency operating mode of the electrical part of the drive system A.

The power electronics 12 also comprise traction drive regulators for the electric motors 13 of the chain drive, a regulator for the electric motor 14 of the cutting shaft drive, as well as a setpoint value input module which can be activated by the driver and various electronic power supply modules which compare corresponding setpoint values with actual values which are determined by monitoring units and correspondingly actuate the regulators as a function of the result of the evaluation.

Figure 3:
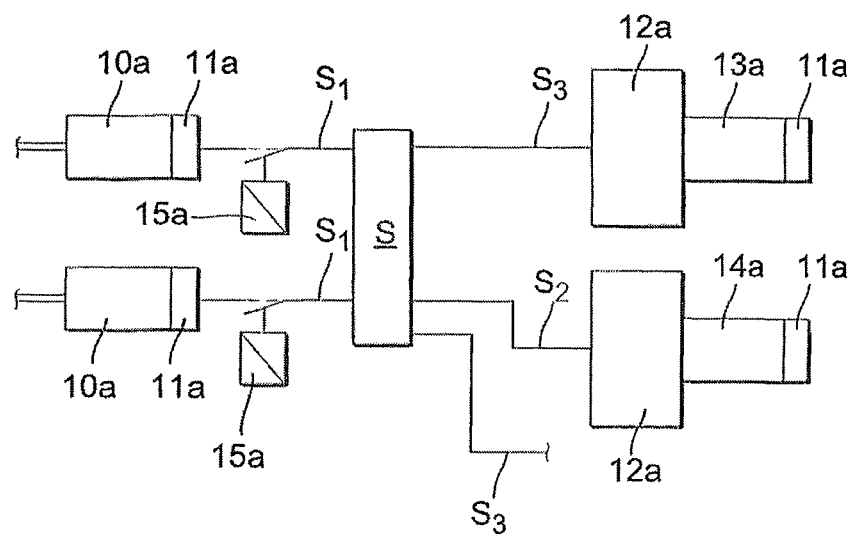
FIG. 3 is a schematic block circuit diagram similar to FIG. 2.

The embodiment according to the invention in FIG. 3 corresponds substantially to the embodiment described above on the basis of FIG. 2. In order to avoid repetitions, reference is made to the disclosure relating to the embodiment according to FIG. 2. Functionally identical components are provided in the embodiment according to FIG. 3 with the same reference symbols with the addition of the letter a. A significant difference in the embodiment according to FIG. 3 is that there is no provision of central power electronics 12, as in the embodiment according to FIGS. 1 and 2. Instead, each electric motor 13a, 14a is assigned separate, individual power electronics 12a which are also arranged spatially directly on the respective electric motor 13a, 14a.

In the same way, in an embodiment of the invention which is not illustrated, separate power electronics can be additionally or alternatively assigned to the two generators 10a.

An electronic component S serves to connect the two generators 10a in a suitable way to the individual power electronics 12a and the assigned electric motors 13a, 14a in order to bring about the desired energy supply and at the same time permit a corresponding feedback from the electric motors 13a, 14a to the generators 10a. The third line $S_3$ is merely indicated for reasons of clarity. Said line $S_3$ also leads to further power electronics 12a which are assigned to the other electric motor 13a.

The invention claimed is:

1. A snow groomer comprising an internal combustion engine, and two generators connected via power electronics to at least two electric motors for rotational functional drives of the snow groomer, wherein the two generators are connected in parallel between the internal combustion engine and the power electronics, and wherein the at least two electric motors for rotational functional drives include at least one first electric motor for a chain drive and a second electric motor for at least one of a cutting shaft drive and a winch drive.

2. The snow groomer according to claim 1, further including a transfer transmission connected to the internal combustion engine, wherein the two generators are connected on an output side of the transfer transmission.

3. The snow groomer according to claim 1, wherein the at least two electric motors of the functional drive comprise a plurality of synchronous motors.

4. The snow groomer according to claim 1, wherein the power electronics comprise a direct current intermediate circuit.

5. The snow groomer according to claim 1, wherein the two generators comprise current rectifiers.

6. The snow groomer according to claim 1, wherein each of the two generators includes an electric switching element which can electrically disconnect a selected one of the two generators from the power electronics.

7. The snow groomer according to claim 6, further including an electronic controller that activates one of the switching elements as a function of functional monitoring of the two generators for disconnection of one of the generators from the power electronics.

8. The snow groomer according to claim 1, wherein the snow groomer includes only one internal combustion engine.

9. A snow groomer comprising:
an internal combustion engine;
two generators connected via power electronics to at least two electric motors; and
a plurality of rotational functional drives for the snow groomer;
each electric motor powering one of the rotational functional drives;
the two generators being connected in parallel between the internal combustion engine and the power electronics; and the plurality of rotational functional drives including a chain drive and at least one of a cutting shaft drive and a winch drive.

10. The snow groomer according to claim 9, wherein the snow groomer includes only one internal combustion engine.

* * * * *